US010627259B2

(12) United States Patent
Rees et al.

(10) Patent No.: US 10,627,259 B2
(45) Date of Patent: Apr. 21, 2020

(54) METHOD OF DETERMINING SUB-DIVISIONAL ERROR OF AN ENCODER APPARATUS CONFIGURED TO MEASURE RELATIVE POSITION OF RELATIVELY MOVEABLE PARTS

(71) Applicant: RENISHAW PLC, Wolton-Under-Edge, Gloucestershire (GB)

(72) Inventors: Martin Simon Rees, Thornbury (GB); Stephen Paul Hunter, Chipping Sodbury (GB); David Sven Wallace, Nympsfield (GB)

(73) Assignee: RENISHAW PLC, Wotton-under-Edge (GB)

( * ) Notice: Subject to any disclaimer, the term of this patent is extended or adjusted under 35 U.S.C. 154(b) by 58 days.

(21) Appl. No.: 15/565,894

(22) PCT Filed: Apr. 28, 2016

(86) PCT No.: PCT/GB2016/051197
§ 371 (c)(1),
(2) Date: Oct. 11, 2017

(87) PCT Pub. No.: WO2016/174433
PCT Pub. Date: Nov. 3, 2016

(65) Prior Publication Data
US 2018/0058884 A1 Mar. 1, 2018

(30) Foreign Application Priority Data
Apr. 29, 2015 (EP) ..................................... 15275124

(51) Int. Cl.
*G01D 5/244* (2006.01)
*G01B 11/00* (2006.01)

(52) U.S. Cl.
CPC ....... *G01D 5/24452* (2013.01); *G01B 11/007* (2013.01); *G01D 5/2449* (2013.01)

(58) Field of Classification Search
CPC ........ G01B 5/004; G01B 5/00; G01B 11/007; G01D 5/24452; G01D 5/2449; G01N 19/02; H03M 1/06; G06F 7/38
See application file for complete search history.

(56) References Cited

U.S. PATENT DOCUMENTS 4,225,931 A * 9/1980 Schwefel ................. G01D 5/36
377/3
6,188,341 B1 * 2/2001 Taniguchi .......... G01D 5/24409
341/111
(Continued)

FOREIGN PATENT DOCUMENTS

CN 101427100 A 5/2009
CN 102270961 A 12/2011
(Continued)

OTHER PUBLICATIONS

"The accuracy of angle encoders." RENISHAW—apply innovation, 2004.
(Continued)

*Primary Examiner* — Lisa M Caputo
*Assistant Examiner* — Nigel H Plumb
(74) *Attorney, Agent, or Firm* — Oliff PLC

(57) ABSTRACT

A method of determining sub-divisional error of an encoder apparatus, which is configured to measure relative position of relatively moveable parts of an apparatus on which an inspection device for inspecting an artefact is mounted, includes causing the inspection device to inspect a feature so as to obtain measurements of a surface of the feature by relatively moving the relatively moveable parts of the apparatus. The method also includes using the measurements of the surface of the feature obtained by the inspection device (Continued)

during the inspection of the feature to determine the subdivisional error of the encoder apparatus.

22 Claims, 8 Drawing Sheets

(56) References Cited

U.S. PATENT DOCUMENTS

| | | | |
|---|---|---|---|
| 7,792,653 B2 | 9/2010 | Grupp et al. | |
| 8,006,398 B2* | 8/2011 | McFarland | G01B 21/045 33/503 |
| 8,336,219 B2* | 12/2012 | Grzesiak | G01B 21/042 33/502 |
| 8,978,261 B2 | 3/2015 | McFarland et al. | |
| 9,542,355 B2 | 1/2017 | Somerville | |
| 2008/0177491 A1* | 7/2008 | Grupp | G01D 5/24452 702/94 |
| 2011/0283553 A1 | 11/2011 | McFarland et al. | |
| 2014/0012409 A1 | 1/2014 | McMurtry et al. | |

FOREIGN PATENT DOCUMENTS

| | | |
|---|---|---|
| CN | 102944258 A | 2/2013 |
| CN | 102971605 A | 3/2013 |
| CN | 103502772 A | 1/2014 |
| EP | 0 048 851 A1 | 4/1982 |
| EP | 2 013 571 B1 | 9/2011 |
| WO | 2004096502 A1 | 11/2004 |
| WO | 2010/139964 A2 | 12/2010 |
| WO | 2015/049174 A1 | 4/2015 |

OTHER PUBLICATIONS

"Technical Data-Sub divisional error." Delta Tau, (http://www.deltatau.co.uk/tech-subdiv.html), 2015.
"iC-NG 8-Bit Sine-to-Digital Converter Processor with Waveform Adaptation." Retrieved 2018 (http:www.ichaus.de/product/ic-ng), stored on Apr. 2015 by Wayback machine (https://web.archive.org/web/20150103125800).
"iC-NG 8-Bit Sin/D Converter-Processor." iC Haus (http://www.ichaus.com), Rev D3, pp. 1-21. 2006.
Dr. Johannes Heidenhain, "Perfect Surfaces with HEIDENHAIN Encoders." HEIDENHAIN. 2013.
Lu et al., "Self-Calibration for Air-Bearing Rotary Encoders," American Society for Precision Engineering, 2006, [http://www.aspe.net/publications/Annual_2006/PAPERS/4METRO1/1971.PDF].
Oct. 1, 2015 Search and Examination Report issued in European Patent Application No. 15 275 124.4.
Jul. 13, 2016 International Search Report issued in International Patent Application No. PCT/GB2016/051197.
Jul. 13, 2016 Written Opinion of the International Searching Authority issued in International Patent Application No. PCT/GB2016/051197.

* cited by examiner

METHOD OF DETERMINING SUB-DIVISIONAL ERROR OF AN ENCODER APPARATUS CONFIGURED TO MEASURE RELATIVE POSITION OF RELATIVELY MOVEABLE PARTS

This invention relates to a method of determining an encoder apparatus' sub-divisional error and an error map for correcting for an encoder apparatus' sub-divisional error.

Apparatus (e.g. measuring apparatus) often have relatively moveable parts and it can be necessary to measure their relative position. Errors in the determined position of the relatively moveable parts of the machine can have a significant impact on the accuracy of the machine. For example, a coordinate measuring machine (CMM) can have numerous relatively moveable parts and it can be necessary to keep track of their relative position so that the position of an inspection device mounted on the CMM can be determined. As a specific example, a measurement apparatus can have an articulated head on which an inspection device (e.g. a measurement probe) is mounted. The articulated head can comprise one or more rotary axes, so as to enable the orientation of inspection device about said one or more axes to be changed. In order to know the position and orientation of the inspection device, it can be important to measure the relative position of the relatively moveable parts of the articulated head.

This invention provides a new method for determining an encoder apparatus' error, in particular a method of determining an encoder apparatus' sub-divisional error (SDE). For example, this application describes a method of determining an encoder apparatus' SDE by analysing the measurements obtained by an apparatus (e.g. a measurement apparatus) in which the encoder apparatus is incorporated, for example by analysing measurements obtained by an apparatus during inspection of an artefact.

The present invention also provides an error map for correcting for an encoder apparatus' sub-divisional error. In particular, the invention provides an error function for correcting for an encoder apparatus' sub-divisional error.

According to a particular first aspect of the invention there is provided a method of determining the sub-divisional error of an encoder apparatus that is configured to measure the position of relatively moveable parts of an apparatus on which an inspection device can be mounted, the method comprising: causing the apparatus to obtain measurements which comprises relatively moving said relatively moveable parts of the apparatus; and using the measurements to determine the encoder apparatus' sub-divisional error.

For example, the invention provides a method of determining the sub-divisional error of an encoder apparatus that is configured to measure the position of relatively moveable parts of an apparatus (e.g. a measurement apparatus) on which an inspection device (e.g. for inspecting the artefact) can be mounted, the method comprising: causing the apparatus to inspect a feature, e.g. a surface (e.g. of an artefact), which comprises relatively moving said relatively moveable parts of the apparatus; and determining the encoder apparatus' sub-divisional error from measurements obtained during the inspection of said artefact. Using measurements obtained during the inspection (e.g. measurement) of a feature, e.g. a surface (e.g. of an artefact) can be beneficial as the feature can provide a reference. This can be the case regardless of whether the feature is a known or unknown artefact. For example, on the assumption that the feature's surface does not include systematic variations at the same frequency as the expected SDE (e.g. at the scale or signal period), then it can be assumed that any such variations are due to the encoder apparatus' SDE. This can avoid the need to use external systems such as a calibrated laser interferometer as a reference.

Accordingly there is provided a method of determining the sub-divisional error of an encoder apparatus that is configured to measure the position of relatively moveable parts of an apparatus (e.g. a measurement apparatus) on which an inspection device (e.g. for inspecting the artefact) can be mounted, the method comprising: causing the apparatus (e.g. the inspection device) to obtain measurements (e.g. of a feature, e.g. of a surface, for example an artefact) which comprises relatively moving said relatively moveable parts of the apparatus; and using measurements (e.g. measurements obtained during inspection/measurement of the feature/surface) to determine the encoder apparatus' sub-divisional error.

Optionally, the method can comprise determining the encoder apparatus' sub-divisional error from the apparatus' measurements alone. In other words, the method can comprise determining the encoder apparatus' sub-divisional error from measurements obtained by the apparatus only. Accordingly, the method can comprise determining the encoder apparatus' sub-divisional error without the need to compare to the measurements obtained by the apparatus to measurements obtained by a secondary measurement device during said movement. Accordingly, the method does not necessarily require the use of external calibration equipment, such as an interferometer, to determine the encoder apparatus' sub-divisional error. Rather, the sub-divisional error can be determined from the apparatus' measurements alone. Accordingly, the method could be described as being a self-calibration technique for determining the encoder apparatus' sub-divisional error.

As will be understood, an encoder apparatus can comprise a scale and one or more readheads which output signals which represent the position and/or motion of the scale relative to the readhead(s). A scale can comprise a series of features, for example a series of generally periodic features. A scale can have a characteristic pitch distance (or angle for some rotary systems, e.g. disc scale on which scale features are radially arranged), but readhead signals can also be used to interpolate between scale pitch intervals to produce position measurements which have a much higher resolution than the scale pitch. There are cases where the readhead produces a spatially periodic signal, and in some embodiments the readhead's signal period has a higher frequency (shorter wavelength) than the scale period. In these cases interpolation can still be used to produce position measurements which have a much higher resolution than signal period. In any case, the interpolation may not be perfect, for example due to misalignment between the readhead and the scale, resulting in systematic position measurement errors which repeat every scale pitch interval. These are known as sub-divisional errors (SDE). SDE is also commonly known as "interpolation error". In this document, SDE and interpolation error can be used interchangeably.

Typically, great efforts are made to minimise the amount of SDE, through encoder design and proper and accurate set up of an encoder apparatus. However, even with careful design and installation/set-up, SDE can still be present to such an extent that it causes undesirable errors in the apparatus' measurement. Determining an encoder apparatus' SDE can therefore be advantageous. For example, if SDE is found to be too great then steps can be taken to reduce the SDE. Optionally, the SDE can error mapped such that the error map can be used to reduce the effects of the encoder apparatus' SDE. This can result in significant improvements in the accuracy of measurements obtained by the apparatus.

Accordingly, the method can comprise determining at least one error map for correcting for the encoder apparatus' sub-divisional error based on measurements obtained during inspection/measurement of the feature/surface (e.g. based on measurement of the feature/surface). The error map could be configured for correcting the encoder apparatus' output. Accordingly, the error map could be configured such that it can be used to correct a determined relative position of the encoder apparatus' scale and readhead. Accordingly, in embodiments in which the encoder apparatus is a rotary encoder apparatus (also known as an angular encoder apparatus) the error map could be configured such that it can be used to correct the determined angular orientation/position of the scale and readhead. Accordingly, in embodiments in which the encoder apparatus is configured to measure the relative position (e.g. relative rotational) position of relatively moveable parts of an apparatus, (e.g. the angular orientation of an articulated head, for instance the angular orientation of an inspection device mounted on an articulated head), then the error map can be configured such that it can be used to correct the determined relative position of the relatively moveable parts of the apparatus.

The at least one error map could comprise a look-up table or function. The error map can be used to determine (e.g. it can describe) the form of the SDE (e.g. the form of the error caused by interpolation). Accordingly, in other words, the error map can describe the shape, waveform, signature or profile of the encoder apparatus' SDE. Accordingly, the error map could comprise a function which describes the form of the SDE. For example, the function can comprise a trigonometric function, for example a Fourier Series. Optionally, the function comprises a polynomial function.

As explained in more detail below, the SDE could be assumed or determined to be the same for every scale (or signal) period along the encoder apparatus' measurement range, or the SDE could vary along the encoder apparatus' measurement range. Accordingly, as explained in more detail below the apparatus could be configured to correct for SDE differently dependent on relative position of the scale and readhead.

For example, the error map could be configured such that its description of the form of the SDE varies along the encoder apparatus' measurement range. Accordingly, optionally, the error map can take into account changes (e.g. variations) in the SDE along the measurement range of the encoder apparatus. Accordingly, for example, rather than assuming that the SDE has the same form along the measurement range of the encoder apparatus (e.g.: in the case of a linear encoder, along at least part of its length; or in the case of a rotary encoder, through at least part of a revolution), the error map can be configured such that the sub-divisional error is corrected differently dependent on the relative position of the parts that the encoder apparatus is measuring. That is, rather than the error map being configured such that sub-divisional error is corrected in the same way throughout the range of encoder apparatus, the error map can be configured to vary the way that sub-divisional error is corrected throughout the range of encoder apparatus dependent on the relative position of the scale and readhead. In other words, the sub-divisional error map can be position dependent. Accordingly, as will be understood, if desired, rather than having a single error map (e.g. a single look-up table) different error maps (e.g. different look-up tables) can be provided for different sections of the range of the encoder apparatus. Optionally, the error map could be configured to correct sub-divisional error differently for different sections of the scale. Each section could comprise at least a single scale period, optionally a plurality of scale periods. In other words, the sub-divisional error map (or error maps) could be tailored for different sections of the scale. Optionally, in the case where the error map comprises a function, optionally the function for correcting the SDE comprises at least one coefficient which itself is dependent on (e.g. is a function of) the relative position of the scale and readhead. Accordingly, the error map can describe the change (e.g. variation) in the SDE along the encoder apparatus' measurement range.

Accordingly, the method can comprise determining the sub-divisional error for different regions of the encoder apparatus' measurement range. Accordingly, the method can comprise for each of said different regions determining the form (e.g. at least one property, e.g. the properties) of a periodic variation in the measurements at at least one predetermined spatial frequency.

The error map could be configured such that it can be used to determine the encoder apparatus' SDE to a resolution finer than the period of the periodic signal. Optionally, the error map has a resolution finer than the scale period. In other words, the error map can be used to determine (e.g. can describe) the form of the SDE to a degree finer than the scale period. The readhead can produce a periodic (in other words cyclical) signal (e.g. a spatially periodic signal) in response to relative movement of the readhead and scale. Accordingly, the error map could be configured such that it can be used to determine the encoder apparatus' SDE to resolution finer than the period of the periodic signal. In other words, the error map can be used to determine (e.g. can describe) the form of the SDE to a degree finer than the period of the periodic signal. For example, in the case of an incremental encoder, the (spatial) period of the signal can be the same as the (spatial) period of the scale's features. However, depending on the encoder apparatus, this need not necessarily be the case. For example, the period of the signal could be half the period of the scale features.

The method can comprise determining the encoder apparatus' SDE based on the form of a periodic variation in the measurements at at least one predetermined spatial frequency. The method can comprise determining the encoder apparatus' SDE based on the form of (e.g. at least one property of, e.g. the properties of) a periodic variation in the measurements at at least one predetermined spatial frequency. In other words, the method can comprise determining the properties of a periodic variation in the measurements at at least one predetermined spatial frequency. The at least one property could describe the periodic variation in the measurements at said at least one predetermined spatial frequency. The at least one property could comprise the amplitude of said variations at said at least one predetermined spatial frequency. The at least one property could comprise the phase offset of said variations at said at least one predetermined spatial frequency. As will be understood, the amplitude and/or phase offset can be represented by the amplitudes of a combination of sine and cosine functions (e.g. without a direct reference to a phase offset). An error map can be based on said determined form/properties.

Optionally, the method comprises assuming that any variation from expected measurements is due to the encoder apparatus' SDE. Accordingly, the measurements could be used to determine an error map based on such variation.

The at least one predetermined spatial frequency can correspond to (for example comprise) the encoder apparatus' scale's period. The at least one predetermined spatial frequency can correspond to (for example comprise) the signal period, e.g. the encoder apparatus' signal period. As will be understood, in some encoders the signal period can be shorter than the scale period, e.g. the signal period could be half the scale period.

Optionally, the at least one predetermined spatial frequency corresponds to (e.g. comprises) at least one harmonic of the scale or signal period. For example, the at least one predetermined spatial frequency can also correspond to (e.g. comprise) at least the second harmonic of the scale or signal period.

The encoder apparatus could be a linear encoder apparatus. The encoder apparatus can be a rotary encoder apparatus. For example, the encoder apparatus could comprise a disc encoder apparatus (in which the scale markings can be provided radially on the face of a disc) or a ring encoder apparatus (in which the scale markings can be provided on the circumferential face/edge of a ring).

The apparatus can comprise at least one rotational axis. For example, the apparatus can comprise an articulated head. The articulated head can comprise at least one rotational axis, for example about which an inspection device can be oriented. The encoder apparatus can comprise a rotary encoder apparatus for measuring the rotational position of the rotational axes (e.g. for measuring the orientation of the inspection device about said rotational axis). The articulated head can be an articulated probe head. In particular, the articulated head can be what is commonly referred to as a continuous head (e.g. as opposed to an indexed head), also commonly known as a scanning head. The articulated head can one or more motors for effecting rotation about said one or more axes.

Accordingly, the articulated head can comprise the rotary encoder apparatus. The articulated head can comprise a first member, and a second member that is mounted for rotation with respect to the first member about a first axis. The articulated head can further comprise a third member that is mounted for rotation with respect to the second member about a second axis. The first and second axes can be non-parallel to each other, for example perpendicular to each other. The articulated head could be configured such that a device, e.g. an inspection device can be mounted on the third member. The second and third members can provide for rotational movement of a device (e.g. an inspection device) about the first and second axes. The rotary encoder apparatus can act between the first and second members to measure their angular position about the first axis (e.g. such that the angular position of a device (e.g. an inspection device) about the first axis can be measured). The rotary encoder apparatus can act between the second and third members to measure their angular position about the second axis (e.g. such that the angular position of a device (e.g. an inspection device) about the second axis can be measured). The first member can be configured to be mounted to a part of an apparatus that is moveable in at least one linear dimension, for example at least two perpendicular linear dimensions, for example three mutually perpendicular linear dimensions. For example, the first member can be configured to be mounted to what is commonly known as the quill (for example the quill of a CMM).

Optionally, a first rotary encoder apparatus is provided which acts between the first and second members to measure their angular position about the first axis, and a second rotary encoder apparatus is provided which acts between the second and third members to measure their angular position about the second axis. In embodiments in which an inspection device is mounted on the articulated head, the first rotary encoder apparatus can be provided which acts between the first and second members to measure angular position of the inspection device about the first axis, and a second rotary encoder apparatus can be provided which acts between the second and third members to measure angular position of the inspection device about the second axis. At least the SDE for the first rotary encoder apparatus can be determined. At least the SDE for the second rotary encoder apparatus can be determined. At least a first error map can be determined for correcting for the first rotary encoder apparatus' sub-divisional error. At least a second error map can be determined for correcting for the second rotary encoder apparatus' sub-divisional error.

As will be understood, an inspection device can be for inspecting an artefact, e.g. a feature, e.g. a surface of the artefact. For example, the inspection device could be a surface sensing device, e.g. for detecting and measuring the position of a surface. For example the inspection device could be a contact measurement probe or a non-contact measurement probe. A contact probe, can comprise a stylus. The contact probe could comprise a stylus shaft and a stylus tip. The stylus shaft can space the stylus tip away from a body of the contact probe. The body of the contact probe can be configured to be connected to the apparatus (e.g. an articulated probe head). The inspection device could be a touch-trigger probe. The inspection device could be an analogue measurement probe, for example an analogue contact measurement probe. As will be understood, an analogue contact probe can provide a measure of the extent of deflection of a probe's stylus relative to the probe body. Said measurements can relate to measurements of the position of a feature, e.g. of the surface of an artefact. For example, in the case of a contact probe having a stylus tip, the measurements can relate to stylus tip position measurements.

The apparatus can comprise a manufacturing apparatus, such as a pick-and-place machine. The apparatus can comprise an articulated arm, such as a robot arm. The apparatus can comprise a measurement apparatus. The apparatus can be a coordinate positioning machine. For example, the apparatus can comprise a machine tool, or a coordinate measuring machine (CMM).

Suitable encoder apparatus comprise magnetic, optical (including transmissive and reflective versions, as well as diffractive and non-diffractive versions), inductive and capacitive encoder apparatus. Suitable encoder apparatus comprise incremental and absolute encoder apparatus. Suitable encoder apparatus comprise enclosed (also known as sealed) encoder apparatus and open (also known as exposed) encoder apparatus.

The encoder apparatus can comprise an incremental encoder apparatus. The encoder apparatus can comprise an absolute encoder apparatus. The encoder apparatus can comprise a combined incremental and absolute encoder apparatus.

As will be understood, an encoder apparatus' scale can comprise a series of features, e.g. an array of features, which can be read by the readhead. The series/array of features can extend in one dimension or two dimensions (accordingly, the encoder apparatus can be a one-dimensional or two-dimensional encoder apparatus). The features can take the form of lines, dots or other shapes.

The scale can comprise a series of substantially periodically arranged features. The period (also referred to as the pitch) of the scale's features could be not more 2 mm, for instance not more than 1 mm, for example not more than 500 µm (microns), optionally not more than 100 µm (microns), for instance not more than 50 μm (microns), and optionally not more than 40 μm (microns).

Optionally, the encoder apparatus comprises a diffractive-based optical encoder. Accordingly, the scale can be configured to diffract light (e.g. from a light source in the readhead) so as to form a resultant signal (e.g. an interference fringe or modulated spots) at the detector which changes with relative movement of the scale and readhead. As will be understood, light can comprise electromagnetic radiation (EMR) having a wavelength anywhere in the infra-red to the ultraviolet regions.

Optionally, the encoder apparatus (e.g. the readhead, for example a detector in the readhead) is configured to produce quadrature signals (e.g. analogue quadrature signals, e.g. SINE and COSINE signals) which vary in response to relative movement of the scale and readhead. The encoder apparatus can be configured to interpolate said quadrature signals. The encoder apparatus' SDE can relate to said interpolation of said quadrature signals. However, as will be understood, this need not necessary be the case. For example, the invention can also be used with encoder apparatus which do not produce such quadrature signals. The invention can also be used with encoder apparatus which do not produce periodic signals in response to relative movement of the scale and readhead. For instance, the invention can be used with an optical image based encoder system. The invention can be used with a snap-shot (e.g. an optical image) based encoder systems which obtain a snap-shot of the scale on demand and from which a relative position of the scale and readhead can be determined. For instance, the invention can be applied to correct the determination of the fine pitch position information in the absolute encoder described in WO2010/139964 which is configured to obtain optical images of an absolute scale.

The measurements can comprise measurements obtained during the inspection of a feature/surface. The measurements could relate to measurements of the feature/surface. The measurements could comprise the output of the encoder apparatus. The measurements could relate to the relative position and/or orientation of relatively moveable parts of the apparatus (e.g. during the inspection of an artefact). The measurements could comprise measurements of any surface within the apparatus' movement (e.g. measurement) volume. The measurements could relate to measurements of an artefact (e.g. a calibration artefact) located within the apparatus movement (e.g. measurement) volume. As will be understood, the feature/surface/artefact can be a part of the apparatus itself (e.g. a surface of a table of the apparatus, e.g. a workpiece table), or a removable object located so as to be within the apparatus' movement (e.g. measurement) volume. As will be understood, a surface is not necessarily an outer surface of an artefact. For example, the surface could comprise an inner surface of an artefact. Also, as will be understood, a feature need not necessarily be a distinctive feature. For example, the feature could comprise a point or line on a flat, planar surface.

As will be understood, measurements of a surface can comprise measurements normal to the surface. For example, in the case of a contact probe, the measurements can be measurements of the tip position normal to a surface. The method can comprise relating position measurements (e.g. surface measurements, tip measurements) to scale measurements (e.g. angular measurements). Optionally, the measurements comprise a determined position of a part of the apparatus. Optionally, the measurements comprise a determined orientation of a part of the apparatus. Optionally, the measurements comprise a determined angular position and/or orientation of an inspection device mounted on the apparatus.

The method can comprise determining an error associated with the measurements and determining the SDE from said error (e.g. based on a variation in said error).

The probe could be a passive probe. The probe could be a rigid contact probe.

Optionally, the apparatus (e.g. the articulated head) can be configured to bias the probe (e.g. a rigid probe) against the surface and drag it along the surface whilst adapting/moving to follow deviations in the surface. For example the apparatus could be servoed in order to keep the probe biased against the surface with a constant force. For example, the apparatus (e.g. the articulated head) could be operated in a constant torque mode.

Optionally, the method comprises obtaining measurements of a feature, e.g. a surface having a known shape. For example, the method comprises obtaining measurements of a spherical shape, e.g. a sphere. The method can comprise obtaining measurements around the sphere, e.g. around its equator line.

Optionally, the method can comprise relatively rotating the inspection device and feature/surface being measured about a rotational axis (e.g. of an articulated head) so as to maintain a nominally constant relative orientation between the probe and the surface of the artefact (e.g. the surface of the sphere). This could be such that the probe is measuring in the substantially same direction relative to itself as it moves along the feature/surface (e.g. around the sphere). For instance, in the case of a contact probe, this could be such that the relative orientation between the surface normal and the stylus length is substantially constant (e.g. substantially perpendicular) during obtaining the measurements.

The method could further comprise measuring an artefact and using the determined sub-divisional error (e.g. using the error map) to correct for the encoder apparatus' sub-divisional error. For example, the method can comprise correcting the encoder apparatus' output. The method can comprise using the corrected output to determine a measurement of the artefact (e.g. the position of the surface of the artefact). As will be understood this could comprise using the corrected output to determine the position of a surface sensing region of the probe.

As will be understood, the error map can be stored wherever is appropriate. For example, the error map can be stored in a permanent or transitory memory device. The error map could be stored locally or remotely from the apparatus. For instance, the error map could be stored in memory located within a part of the measurement apparatus (e.g. within the articulated head). Optionally, the error map is stored in a computer, e.g. a controller, associated with the apparatus.

According to a second aspect of the invention there is provided a method of determining the sub-divisional error of an encoder apparatus comprising a scale and readhead, the method comprising: moving the scale and readhead relative to each other and obtaining measurements; and determining the encoder apparatus' sub-divisional error based on a (e.g. an identifiable) periodic variation in said measurements at at least one predetermined spatial frequency. For example, according to a third aspect of the invention there is provided a method of generating an error map for correcting for sub-divisional error in the output of an encoder apparatus comprising a scale and readhead, the method comprising: moving the scale and readhead relative to each other and obtaining measurements; and generating an error map for correcting the encoder apparatus' sub-divisional error based on a (e.g. an identifiable) periodic variation in said measurements at at least one predetermined spatial frequency. This could be done with the encoder apparatus installed in an apparatus (e.g. a measurement apparatus). According to a fourth aspect of the invention there is provided a method of generating an error map for correcting for sub-divisional error in the output of an encoder apparatus which is configured to monitor the position of relatively moveable parts of an apparatus, the method comprising: moving the relatively moveable parts of the apparatus relative to each other and obtaining measurements; and generating an error map for correcting the encoder apparatus' sub-divisional error based on a (e.g. an identifiable) periodic variation in said measurements at at least one predetermined spatial frequency.

Accordingly, optionally the invention relies on the assumption that variations in the measurements at at least one predetermined spatial frequency are caused by the encoder apparatus' SDE and basing the determined SDE and optionally any error map on that assumption.

The error map could be generated based on the form (e.g. the properties) of a periodic variation in said measurements at at least one predetermined spatial frequency. In other words, the method can comprise identifying the characteristics of a periodic variation in the measurements at said at least one predetermined spatial frequency. For example, the method can comprise identifying the form of a periodic variation in the measurements at said at least one predetermined spatial frequency. For example, the method can comprise identifying at least one property (e.g. the properties) of a periodic variation in the measurements at said at least one predetermined spatial frequency. The at least one property (e.g. the properties) could describe the periodic variation at said at least one predetermined spatial frequency.

The measurements can comprise measurements of a feature, e.g. a surface (e.g. of an artefact) obtained during such relative motion. For example, the measurements can comprise measurements of the position of a surface of an artefact. For example, in line with example embodiments given above and below, the measurements could relate to the (e.g. could comprise the determined) position of a stylus tip (e.g. of a contact probe) during said relative movement.

Optionally, the measurements comprise the encoder apparatus' output during said relative motion. Accordingly, the method could comprise determining at least one property (e.g. the properties) of a periodic variation in the output of the encoder apparatus (e.g. in the output of the readhead) during said relative movement. The encoder apparatus' output could comprise the output from a scale detector in the readhead, either processed or unprocessed. For example, the encoder apparatus' output could comprise the readhead's output. Optionally, the encoder apparatus' comprises the output from an interpolator associated with the readhead. Optionally, the encoder apparatus' output comprises a position measurement of the scale and readhead based on scale readings. The measurements can be obtained (e.g. recorded) against time.

Optionally, the measurements could relate to a determined relative position and/or orientation of the relatively moveable parts of an apparatus (e.g. a measurement apparatus) in which the encoder apparatus is incorporated during said motion.

The method can comprise generating the at least one error map such that it is different for different regions of the encoder apparatus' range so as to accommodate for differences in the encoder apparatus' sub-divisional error throughout its range. Accordingly, the at least one error map can be different for different regions of the encoder apparatus' range.

The predetermined frequency can comprise the readhead signal period or the scale period, and optionally harmonics thereof.

According to another aspect of the invention there is provided a computer implemented method comprising receiving measurements obtained by an apparatus (e.g. measurement apparatus) in which the encoder apparatus is incorporated, the measurements being derived from the encoder apparatus' output, and determining the encoder apparatus' sub-divisional error from said measurements. The measurements could comprise measurements of the surface of the feature. The measurements could be obtained via an inspection device. The inspection device could be a surface sensing device, e.g. for detecting and measuring the position of a surface. For example the inspection device could be a contact measurement probe or a non-contact measurement probe.

As will be understood, the method could be implemented via bespoke dedicated electronics (e.g. an FPGA) or for example could via software running on a generic processor.

As will be understood, the above described methods can be computer implemented methods.

According to a further aspect of the invention there is provided a computer implemented method comprising generating an error map for correcting for an encoder apparatus' sub-divisional error based on properties of a periodic variation in measurements at at least one predetermined spatial frequency. Accordingly, the method can comprise, receiving measurements, analysing said measurements to determine any periodic variation therein at at least one predetermined frequency, and generating an error map based on (e.g. the form of, or at least one property, e.g. the properties, of) any such periodic variation.

According to a yet further aspect of the invention there is provided computer program code comprising instructions, which when executed by a computer causes the computer to perform any of the above described methods.

There is also provided according to a further aspect of the invention a computer readable medium, bearing computer program code as described above.

Further still according to the invention there is provided an encoder apparatus comprising a scale and a readhead for detecting the scale, in which at least one error function is provided which describes the form of the encoder apparatus' sub-divisional error (e.g. the form of the encoder apparatus' sub-divisional error).

Said description of the sub-divisional error can vary along the encoder apparatus' measurement range. Optionally, the function comprises at least one coefficient which itself is dependent on (e.g. is a function of) the relative position of the scale and readhead.

There is also provided according to the invention an apparatus (e.g. a measurement apparatus) comprising an encoder apparatus as described above.

The apparatus (e.g. the measurement apparatus) can be for inspecting an artefact and the at least one encoder apparatus could be configured to be used in determining the position of an inspection device mounted on the apparatus.

As will be understood, features described above in connection with any one of the above mentioned aspects of the invention are also applicable to the other aspects of the invention.

Embodiments of the invention will now be described, by way of example only, with reference to the following drawings, in which.

Figure 2:
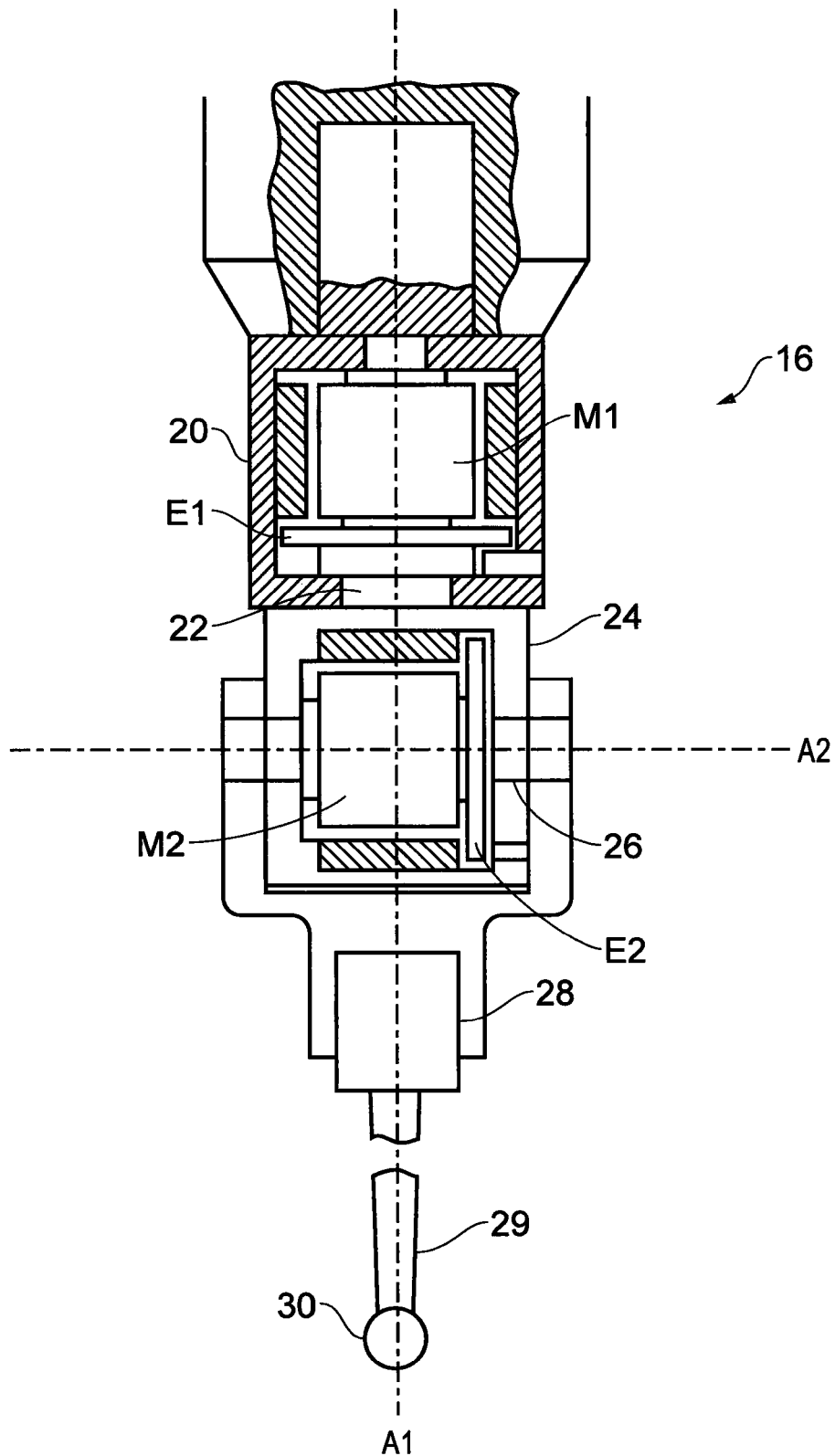
FIG. 2 illustrates a cross-sectional view of the articulated head shown in FIG. 1.
Figure 3:
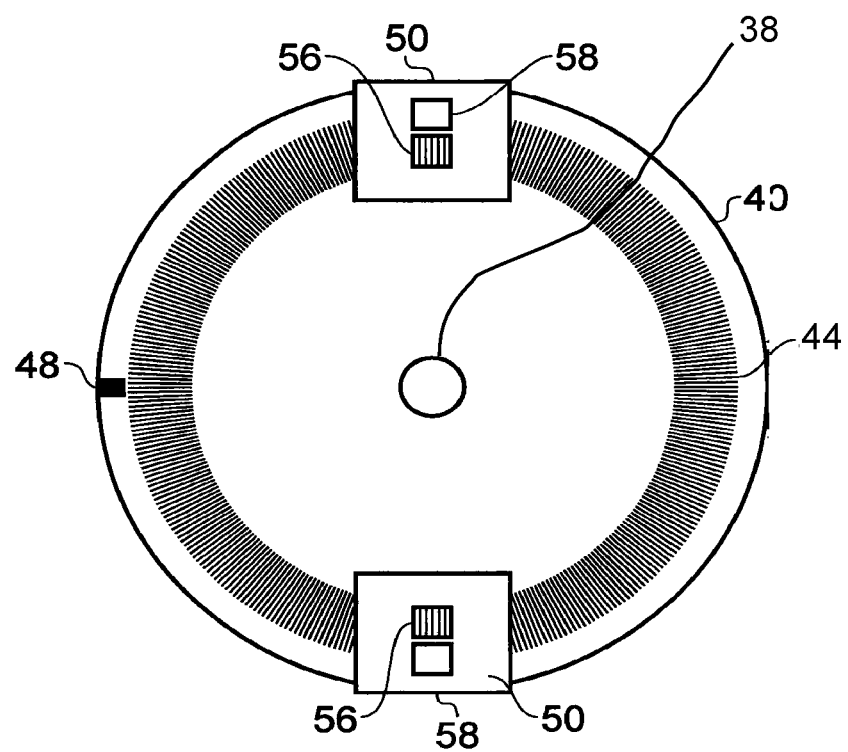
Figure 4:
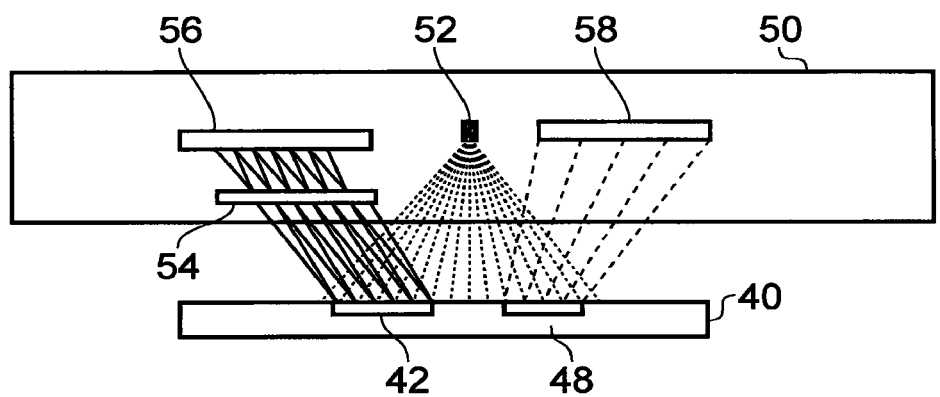
Figure 5:
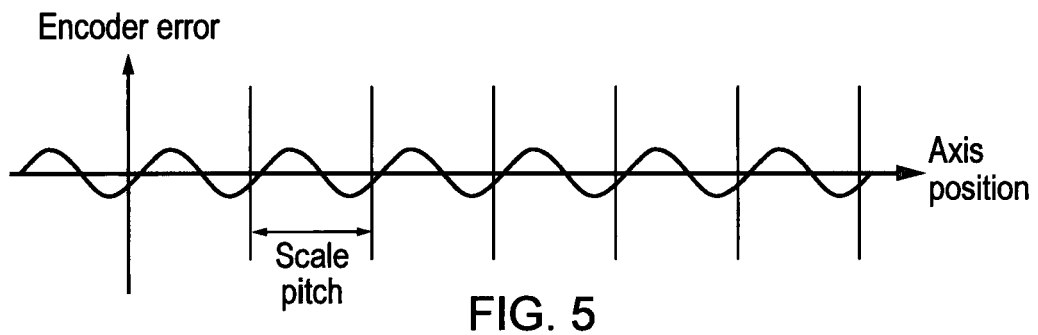
Figure 6A:
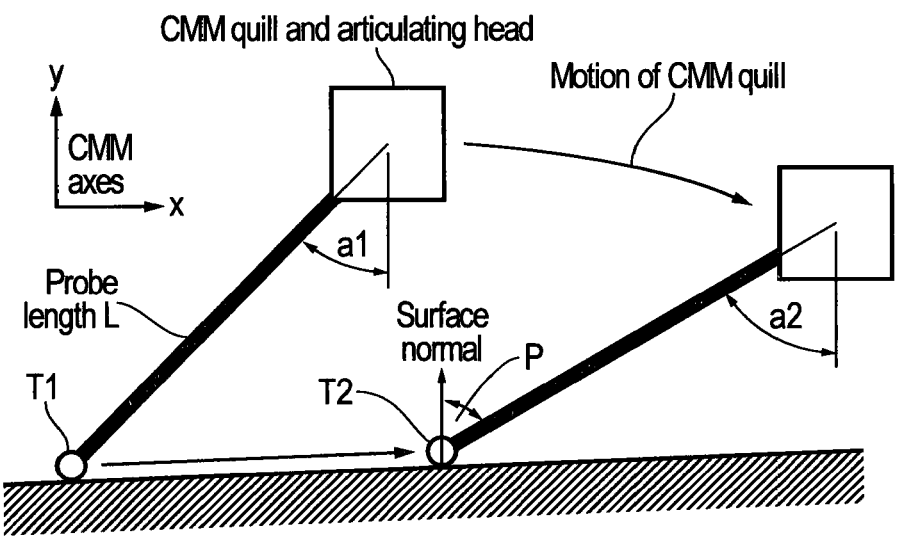
Figure 6B:
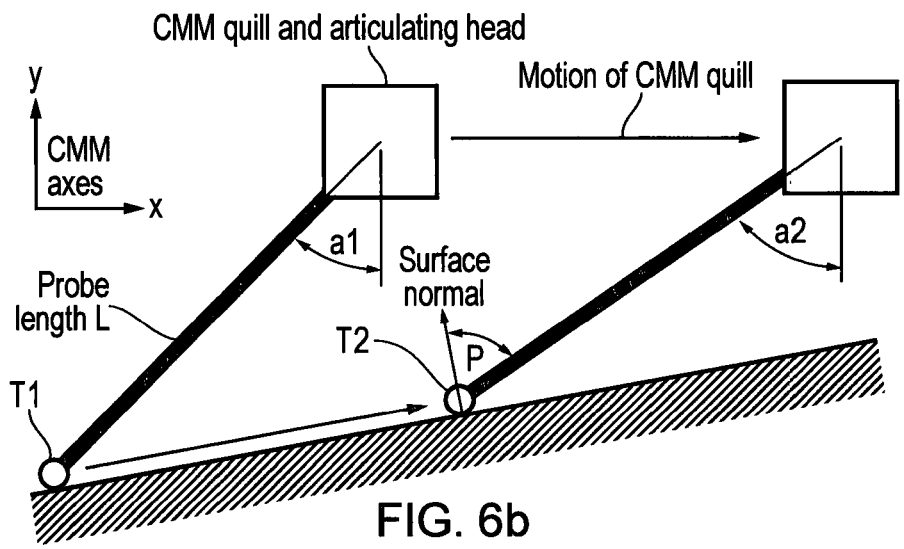
Figure 7:
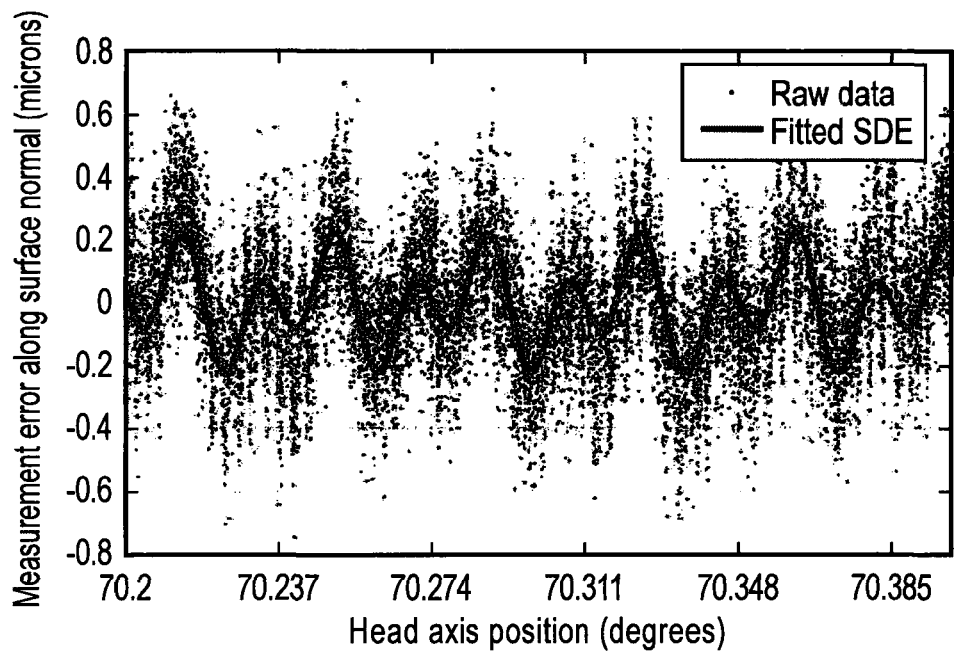
Figure 8:
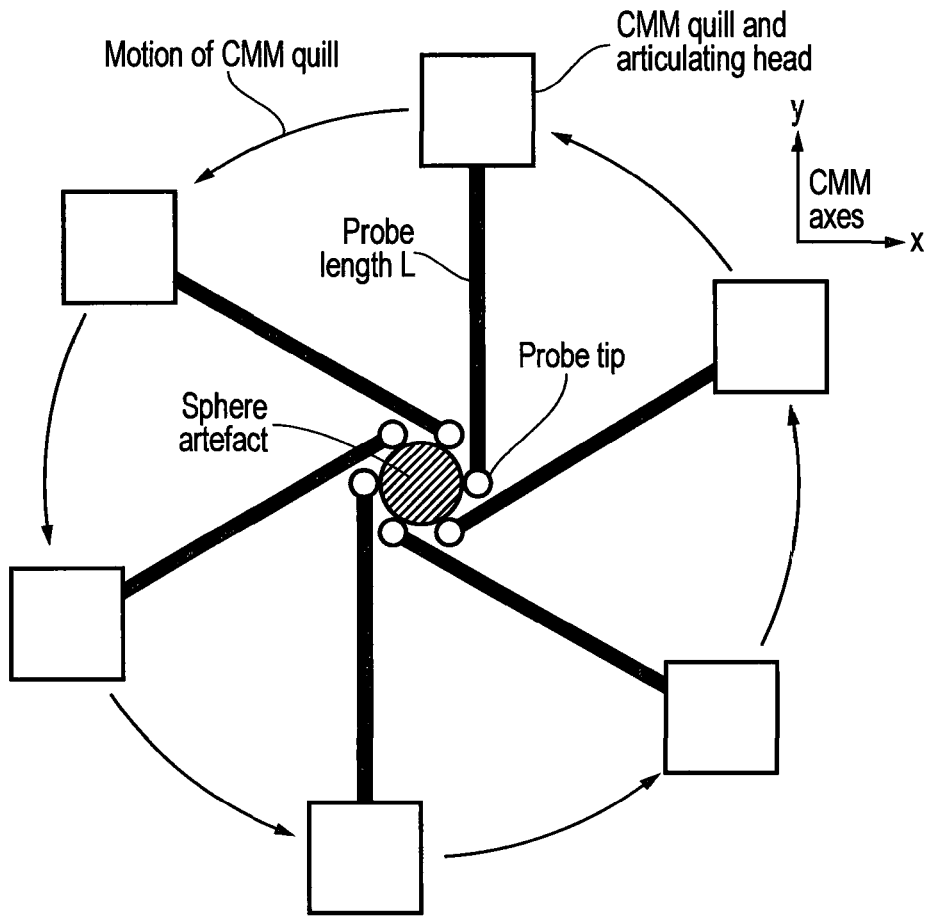
Figure 9:
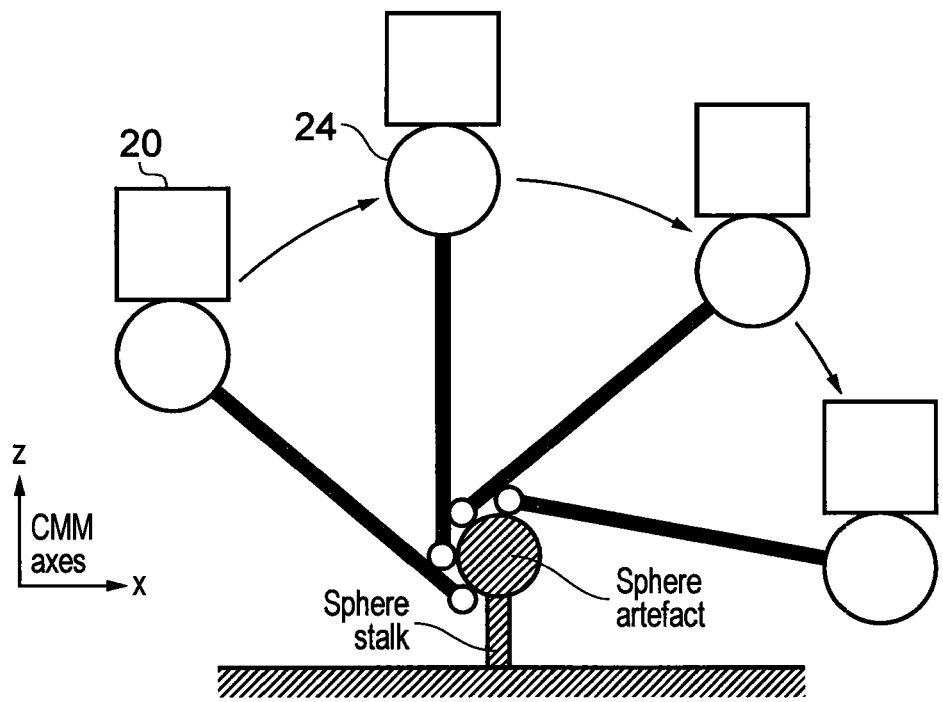
Figure 10:
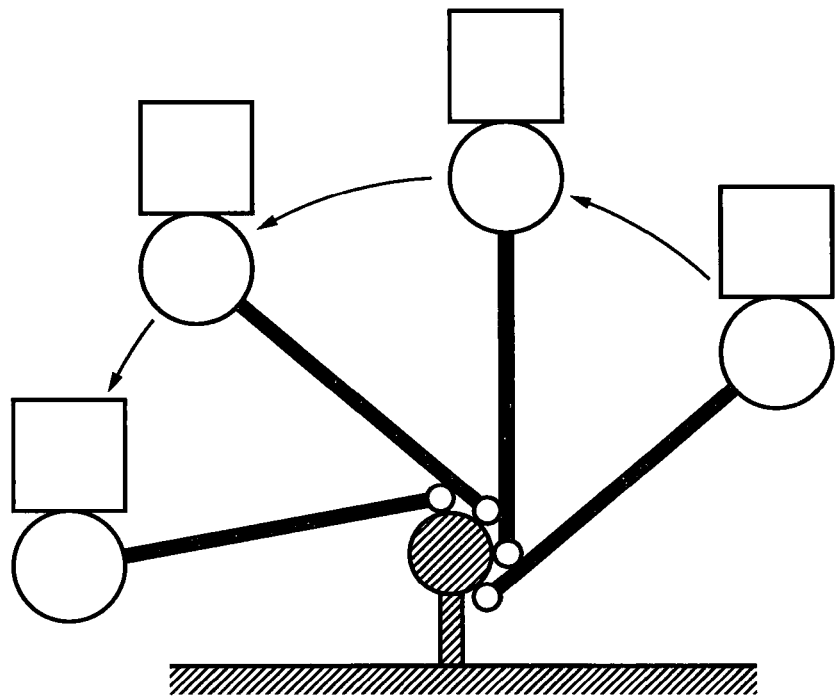
Figure 11:
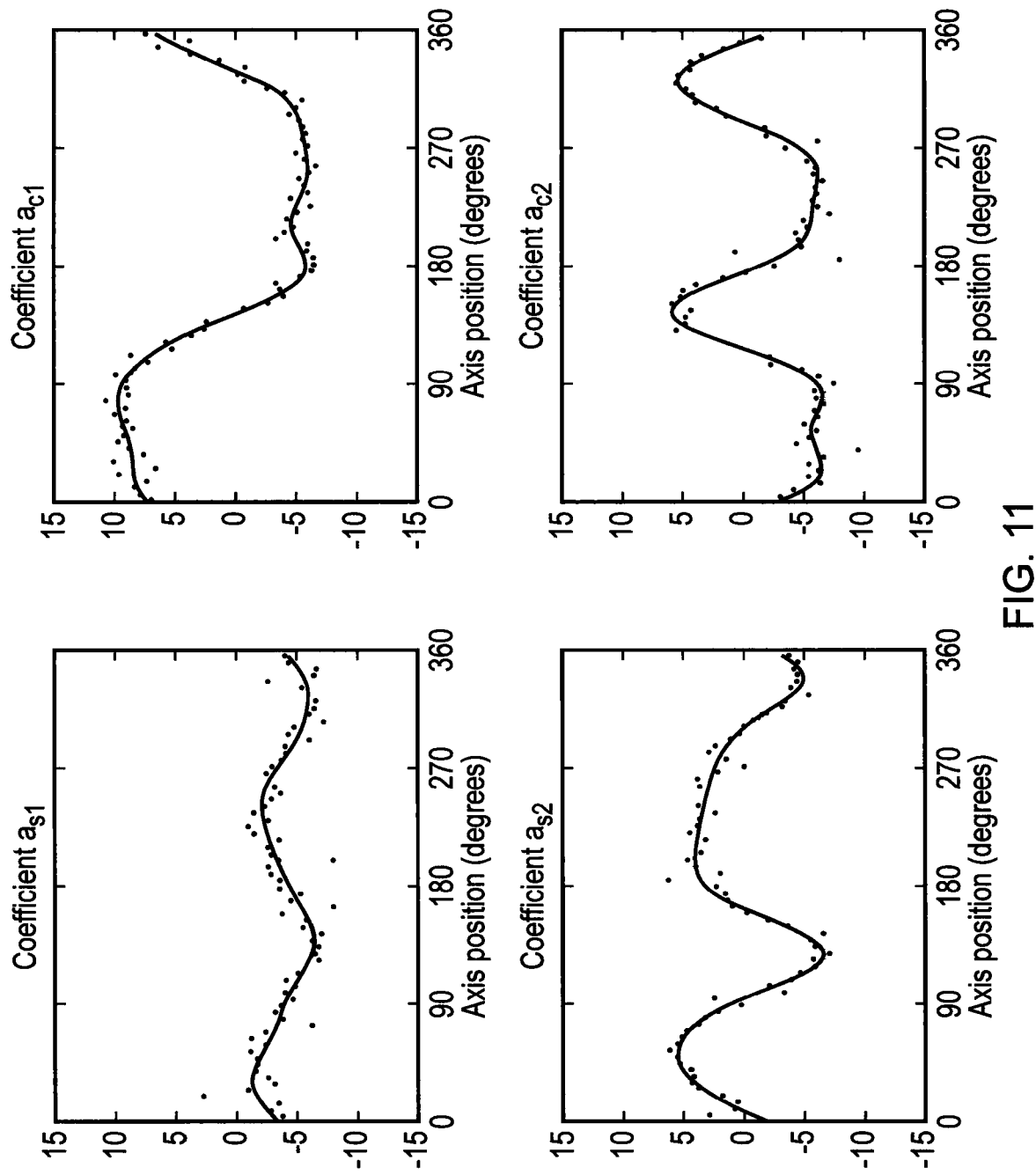
Figure 12:
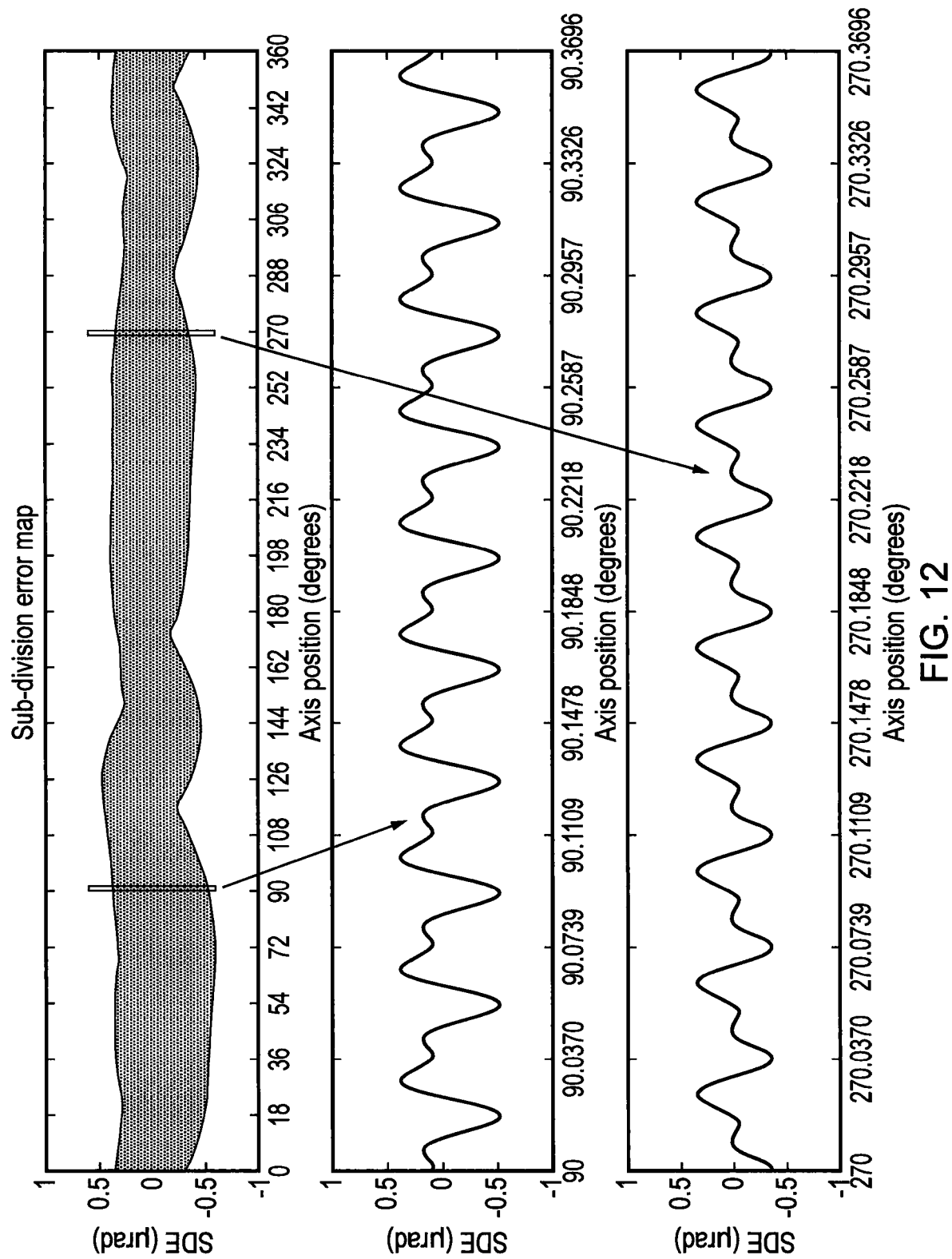

FIG. 3 schematically illustrates an example scale and readhead(s) of a rotary encoder apparatus suitable for use in the articulated head of FIG. 2;

FIG. 4 schematically illustrates the optical scheme of the scale and readhead of FIG. 3;

FIG. 5 schematically illustrates the sub-divisional error of the encoder apparatus of FIGS. 3 and 4;

FIG. 6*a* schematically illustrates an example method for obtaining measurements from which the rotary encoder apparatus' sub-divisional error can be determined;

FIG. 6*b* schematically illustrates another example method for obtaining measurements from which the rotary encoder apparatus' sub-divisional error can be determined;

FIG. 7 is graph of some of the measurements obtained by the method illustrated in FIG. 6*a* or 6*b*;

FIG. 8 schematically illustrates another example method for obtaining measurements from which the rotary encoder apparatus' sub-divisional error can be determined;

FIGS. 9 and 10 schematically illustrate a yet further example method for obtaining measurements from which the rotary encoder apparatus' sub-divisional error can be determined;

FIG. 11 comprises a plurality of graphs illustrating how the coefficients of the function which describes the rotary encoder apparatus' sub-divisional error can vary throughout the rotary encoder apparatus' measurement range;

FIG. 12 illustrates an example sub-divisional error map and illustrates how that the form of an encoder apparatus' sub-divisional error can vary throughout the encoder apparatus' measurement range.

Figure 1:
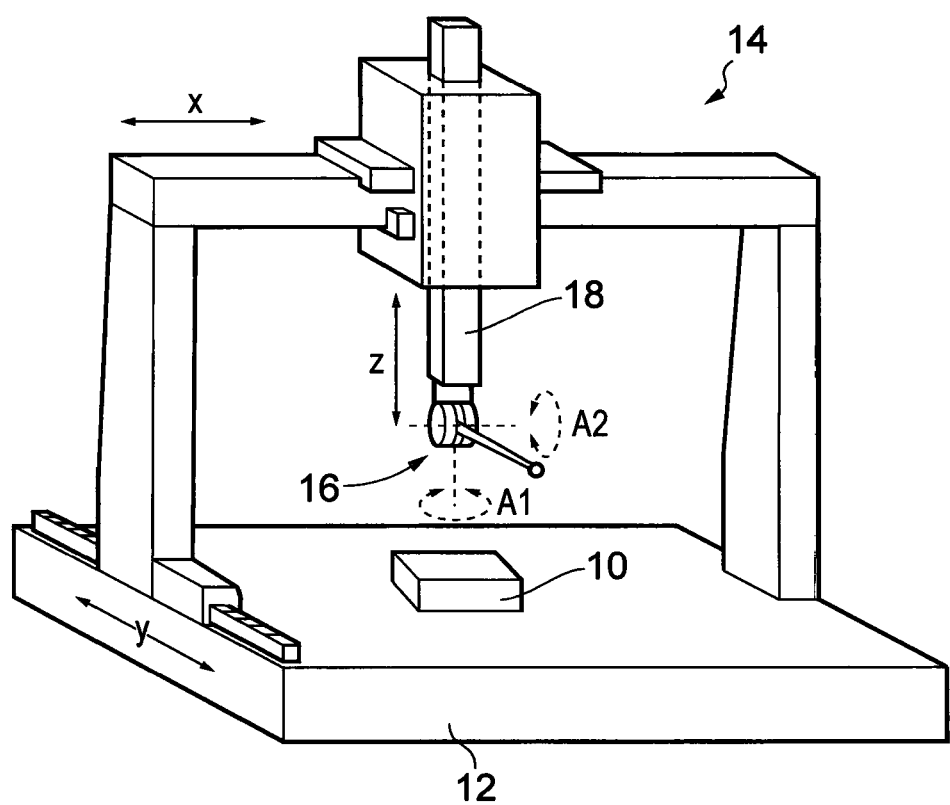
FIG. 1 illustrates a CMM comprising an articulated head on which an inspection device for measuring a workpiece is mounted.

FIG. 1 illustrates a motorised articulated scanning (continuous) head 16 mounted on a coordinate measuring machine (CMM) 14. A workpiece 10 to be measured is placed on a table 12 of the CMM 14 and the motorised scanning head 16 is mounted on a quill 18 of the CMM 14. The quill 18 is driveable in the directions X, Y, Z relative to the table by motors in a known manner.

As illustrated in FIG. 2, the motorised scanning head 16 comprises a fixed part formed by a base or housing 20 supporting a movable part in the form of a shaft 22 rotatable by a motor M1 relative to the housing 20 about a first axis A1. The shaft 22 is secured to a further housing 24 which in turn supports a shaft 26 rotatable by a motor M2 relative to the housing 24 about a second axis A2 perpendicular to the first axis A1.

A probe 28 with a stylus 29 having a workpiece contacting tip 30 is mounted onto the motorised scanning head 16. The arrangement is such that the motors M1, M2 of the head can position the workpiece contacting tip 30 angularly about the axes A1 or A2 and the motors of the CMM 14 can position the motorised scanning head linearly anywhere within the three-dimensional coordinate framework of the CMM. Any combination of such motions can be controlled so as to bring the stylus tip 30 into a predetermined relationship with the surface being scanned.

Linear encoders (also known as linear position transducers) (not shown) are provided on the CMM for measuring linear displacement of the scanning head and angular/rotary encoders (also known as angular position transducers) E1 and E2 are provided in the scanning head for measuring angular displacement of the stylus about the respective axes A1 and A2.

In this embodiment, the probe has a deflectable stylus 29 and transducers in the probe measure the amount of stylus deflection. As will be understood, other types of probe may be used. For example, a touch-trigger probe which indicates that contact has occurred (rather than provide a measure of the extent of deflection) can be used. A rigid probe could be used. For instance, the articulated head could be operated to bias the rigid probe against the surface (e.g. in a constant torque mode) as it moves along the surface. Optionally, a non-contact probe may be used instead of or in addition to a contact probe. The probe may be one dimensional (e.g. a non-contact probe which senses distance from surface), two dimensional (e.g. a contact probe sensing deflection in X and Y) or three dimensional (e.g. a contact probe sensing deflection in X, Y and Z).

In the embodiment described, the A1 axis of the scanning head 16 is nominally parallel to the CMM Z axis (which is along the quill 18). The scanning head may rotate the probe continuously about this axis. The A2 axis of the scanning head is orthogonal to its A1 axis.

When measuring a part, it can be important to know the precise angle about which the probe is positioned about the first A1 and second A2 axes. As will be understood, since the point being measured is offset from the source at which the angle is measured (i.e. in this case the stylus tip position is offset from the angular encoder in the head), any error in the determined angular position is amplified due to the offset distance. In other words, the magnitude of any error in the determined position increases away from the source. Accordingly, it can be important to ensure that the output of the angular encoders E1 and E2 contain as little error as possible.

A more detailed description of an example angular encoder suitable for use in the articulated head of FIGS. 1 and 2 will now be provided with reference to FIGS. 3 to 5. As shown in FIG. 3, the encoder apparatus can comprise a disc 40 that has, around its periphery on the plane face of the disc, an incremental scale 42 that is made up of a series of alternately light reflecting and non-reflecting lines 44. The lines 44 extend radially and are circumferentially spaced apart from each other. In the described embodiment the scale 42 is an amplitude scale, but as will be understood a phase scale structure could alternatively be provided. In this embodiment a pair of readheads 50 are located adjacent the scale. The readheads 50 are arranged to be rotatable relative to the incremental scale 42 about a central bearing 38. In this embodiment, the encoder apparatus is configured such that the scale 40 rotates with rotational movement of the axis of the articulated head, but as will be understood it could be configured to be the other way around such that the readhead(s) rotate with rotational movement of the axis of the articulated head. As will be understood, only a single readhead 50 is needed, but having two or more readheads can be useful, e.g. for removing errors caused by any eccentricity in the rotational motion of the scale and/or readheads.

Referring to FIG. 4, a readhead 50 of the apparatus described with reference to FIG. 3 is shown in more detail. The readhead 50 includes a light source 52, an index grating 54, an incremental detector 56 and a reference mark detector 58. In summary, light emitted from the light source 52 is reflected and diffracted by the incremental scale 42. The reflected, diffracted light interacts with the index grating 54 which further diffracts the light, which interferes to form an interference fringe at the detector 56, which moves with relative movement of the disc 40 and readhead 50. The detector 56 detects the interference fringe and provides output signals in response. As will be understood, the readhead can produce what is commonly known as analogue quadrature signals (e.g. SIN and COS signals) which can be used to detect and report relative position and motion of the disc 40 and readhead 50.

As will be understood, the disc 40 can have one or more reference marks 48 which define one or more reference positions. In the embodiment described, the reference mark 48 is placed adjacent to the incremental scale 42, and as schematically illustrated by FIG. 4 is located within the readhead's 50 light source's 52 footprint. In the embodiment described and shown the reference mark 48 is configured to reduce the amount of light reflected back toward the reference mark detector 58 in the readhead 50 (but could be configured differently, e.g. to increase the amount of light reflected back toward the reference mark detector and/or provide a change in the pattern of light reflected back toward the reference mark detector). The encoder apparatus is configured to detect and report a change at the reference mark detector 58 to signal that the readhead 50 and scale 40 are at a reference position. Such a type of encoder is well known and for example described in more detail in WO2015/049174, the details of which are incorporated herein by this reference.

As will be understood, the invention is also applicable to other types of encoder, including other types of incremental optical encoder (including for example those that do not rely on the diffraction and interference of light), as well as non-optical encoders (e.g. magnetic, capacitance, inductive encoders), linear encoders, and absolute encoders too.

As is commonly known, the signals reported by a readhead and/or its detector can be interpolated to produce position measurements which have a much higher resolution than the pitch (also known as "period") of the scale features. There are cases where the readhead's signal period has a higher frequency (shorter wavelength) than the scale period, in which case interpolation can still be used to produce position measurements which have a much higher resolution than signal period. In any case, the interpolation might not be perfect, for example due to misalignment of the readhead and scale, resulting in systematic errors which repeat every scale pitch and/or signal period interval, e.g. as schematically illustrated in FIG. 5. As shown the error is not constant within a scale/signal period, rather they vary (cyclically/periodically/repetitively) within a scale/signal period. These are known as sub-divisional errors (SDE). SDE is also commonly known as "interpolation errors". In this document the terms, SDE and interpolation errors can be used interchangeably and mean the same thing.

For example, taking the rotary encoder of the above described embodiment, with N scale/signal periods intervals per revolution, the form of any SDE can be represented by a function, e.g. by a series of harmonic functions:

$$E(A) = \sum_{i=1}^{n} a_{si}\sin(iNA) + a_{ci}\cos(iNA) \tag{1}$$

where $E(A)$ is the encoder error (e.g. in radians) as a function of axis position A (e.g. in radians), $a_{si}$ and $a_{ci}$ are the amplitudes of the harmonic components, and n is the maximum harmonic order.

In the described embodiment, it has been found that the $1^{st}$ and $2^{nd}$ orders are sufficient for representing the encoder apparatus' SDE. Accordingly, the SDE can be described by:

$$E(A) = a_{s1}\sin(NA) + a_{c1}\cos(NA) + a_{s2}\sin(2NA) + a_{c2}\cos(2NA) \tag{2}$$

Accordingly, once the amplitude of the harmonic components $a_{s1}$, $a_{c1}$, $a_{s2}$, $a_{c2}$ are found the function describes the SDE. An error map can then be created. For example, the error map can comprise the error function. The function could for example be applied to calculate the error each time a position from the encoder apparatus is required. Optionally, the error map could take a different form, and for example could be derived from the function. For instance, a look-up table could be generated from the function. As will be understood, depending on the specific encoder being used, more or fewer orders could be used in order to adequately describe the SDE.

Two new methods for determining the SDE of an encoder apparatus are described below.

With reference to FIG. 6a, a first method of measuring the SDE of a rotary axis of the articulated head 16 described above comprises measuring a planar surface which is positioned with its surface normal perpendicular to the axis of rotation of which the SDE is to be measured (although as will be understood this need not necessarily be the case). The surface normal of the plane can first be measured, then a linear scan can be performed on the plane from tip position T1 to position T2, with the head axis position changing from angle a1 at the start of the scan to angle a2 at the end of the scan. FIG. 6a shows an example movement for a rotary axis parallel to the CMM z-axis (i.e. axis A1).

FIG. 6b illustrates a slight variation on this method, which avoids any linear movement of the CMM along the axis in which measurements are being obtained (e.g. in this case along the CMM's y-axis). This can help to ensure that any identified SDE is only due to the rotary encoder and not due to any SDE arising from the y-axis' linear encoder.

As described above, the angular error due to SDE can be modelled as:

$$E(A) = a_{s1}\sin(NA) + a_{c1}\cos(NA) + a_{s2}\sin(2NA) + a_{c2}\cos(2NA) \tag{3}$$

This angular error causes a tip position measurement error "d(A)" along the plane's surface normal:

$$d(A) = L\sin(P)E(A) \tag{4}$$

where P is the angle between the probe and the plane surface normal (e.g. in radians) and L is the probe length (from the rotary axis to the probe tip) (e.g. in mm). This expands to:

$$d(A) = L\sin(P)[a_{si}\sin(NA) + a_{c1}\cos(NA) + a_{s2}\sin(2NA) + a_{c2}\cos(2NA)] \tag{5}$$

A high-resolution linear scan along the plane produces a set of axis angles A and distance measurements d. A best fit (e.g. a linear best fit) to this data can be used to determine the harmonic coefficients $a_{s1}$, $a_{c1}$, $a_{s2}$ and $a_{c2}$. As will be understood, the measurement data can be analysed in different ways to determine the coefficients, e.g. by performing a Fourier analysis (e.g. a Fast-Fourier Transform) on the data set to determine the values of the coefficients at the predetermined frequencies. Although there are many other sources of error which affect the distance measurements, the SDE can be reliably extracted because it has a very specific spatial frequency (as determined by the encoder scale pitch), and it is unlikely that any other effects would contribute systematically at this frequency.

As will be understood, in an alternative embodiment, distance measurements d can be converted to encoder angles before performing the best fit.

An example data set from an angular encoder having a scale pitch of 0.037 degrees is shown in FIG. 7.

A disadvantage with using a plane artefact is that only a restricted range of the rotary encoder can be measured in a single scan. To measure the full range of the encoder a spherical artefact can be used. With a spherical artefact, a scan can be performed around the sphere, (e.g. along the equator line of the sphere) while always keeping the probe perpendicular to the surface normal at the point of contact between the probe and the sphere, as shown in FIG. 8.

Errors in the measurement system can now be determined by examining the radius measurement error at any given point. Since the angle between the probe and the surface normal is always 90 degrees, the sin(P) term used for the plane measurement can now be removed, resulting in the model of SDE error:

$$r(A) = [a_{s1}\sin(NA) + a_{c1}\cos(NA) + a_{s2}\sin(2NA) + a_{c2}\cos(2NA)] \quad (6)$$

where r(A) is the measured radius error of the probe tip on the sphere artefact. As before, a linear fit to this data can be used to determine the harmonic coefficients $a_{s1}$, $a_{c1}$, $a_{s2}$ and $a_{c2}$.

For a rotary axis perpendicular to the CMM z-axis (e.g. the A2 axis), it might not be possible to scan all the way around the sphere due to the sphere mounting stalk obstructing the probe. To measure the full range of the axis, the data from two separate scans can be combined, as schematically illustrated in FIGS. 9 and 10.

Since the form of any SDE can be affected by the alignment of readheads relative to the scale, the SDE might not be the same throughout the full range of the axis since the alignment of the readheads may vary with axis position. To take account of this effect, the harmonic coefficients $a_{s1}$, $a_{c1}$, $a_{s2}$ and $a_{c2}$ can become functions of axis position.

For example, after collecting data by scanning the equator of a sphere, rather than analysing it all in one go the data can be split into small sections based on axis position, and these can be analysed separately to produce a set of harmonic coefficients valid only for the position range. For example, the data captured between axis positions 0 and 5 degrees is analysed to give a set of coefficients, then the data between 5 and 10 degrees is analysed to give another set of coefficients, and so on. The variation of the coefficients can then be plotted as functions of axis position, an example of which is shown in FIG. 11.

The variation of the coefficients can also be parameterised using harmonic functions. In the currently described embodiment, up to and including the $5^{th}$ order can be sufficient for modelling the variation of the coefficients along a scale, so for example the following equations can be sufficient for modelling the variation in SDE:

$$a_{s1} = b_0 + \sum_{j=1}^{5} b_{sj}\sin(jA) + b_{cj}\cos(jA) \quad (7)$$

$$a_{c1} = c_0 + \sum_{j=1}^{5} c_{sj}\sin(jA) + c_{cj}\cos(jA) \quad (8)$$

$$a_{s2} = d_0 + \sum_{j=1}^{5} d_{sj}\sin(jA) + d_{cj}\cos(jA) \quad (9)$$

$$a_{c2} = e_0 + \sum_{j=1}^{5} e_{sj}\sin(jA) + e_{cj}\cos(jA) \quad (10)$$

This means that the variation of each "a" coefficient is modelled by 11 parameters, resulting in a total of 44 parameters required to characterise the SDE for one axis.

As will be understood, the error map can be stored wherever is appropriate, e.g. in memory associated with the apparatus.

As will be understood, although the above error map comprises a harmonic series function, this need not necessarily be the case. For instance, rather than a harmonic series, the SDE could be represented by a polynomial function. Accordingly, the error map could comprise a polynomial function. Further still, as will be understood, the error map could comprise a look-up table instead of a function which describes the SDE. In the case of a look up table, the look-up table can have a density matching the required resolution (e.g. a single data entry could exist for every possible interpolated position), or could have a sparser density in which case interpolation between entries in the table could be required. As will be understood, there are various ways in which a look up table could be implemented and used. For example, one look-up table could be provided which maps the correction entire measurement range of the encoder apparatus. Optionally, one look-up table is provided which has a basic form and modifiers are provided which are dependent on relative position of the scale and readhead.

Optionally, a plurality of look-up tables are provided which are specific to different axis ranges. Optionally, a plurality of look-up tables are provided for given axis positions, and the SDE error for positions between those given axis positions can be interpolated therefrom.

The above describes an example implementation of the invention in connection with a rotary encoder apparatus. However as will be understood the invention can also be used to determine the SDE of a linear encoder apparatus. Accordingly, for example, the probe tip could be driven into an artefact by virtue of movement of one of the linear axes of the CMM (e.g. along the Y-axis) so as to cause the probe's stylus to deflect. A series of measurements relating to the position of the probe tip during such deflection can be collected. The determined position of the stylus' tip should be constant, and so any variation in the measurements at the predetermined spatial frequency at which SDE is expected to occur (i.e. at the scale/signal period and harmonics thereof) can be attributed to the linear encoder's SDE. Such a technique could be repeated along different or even the entire linear axis, and/or the SDE measured could be assumed to be constant for regions/the entire range of the linear encoder. In any case, as will be understood, the form of the SDE for a linear encoder could be represented as follows:

$$E(x) = \sum_{i=1}^{n} a_{si}\sin\left(\frac{2\pi i x}{p}\right) + a_{ci}\cos\left(\frac{2\pi i x}{p}\right) \quad (11)$$

Where p=scale pitch (e.g. in mm), x=position (e.g. in mm) and n=2 (for example).

The above describes a method of determining an encoder apparatus' SDE by analysing the measurements obtained during the inspection of an artefact, and using measurements that are not necessarily the direct output of the encoder apparatus. Accordingly, rather than analysing the direct output of an encoder apparatus to establish the SDE, the above describes a method by which the SDE is derived from measurements which themselves were derived in part using the output of the encoder apparatus. In other words, the above could be described as a technique for indirectly obtaining an encoder apparatus' SDE.

The above also describes that the SDE can be obtained by analysing the variation in the measurements obtained by an apparatus at predetermined frequencies in order to establish the SDE. In particular, it describes a technique for determining properties (namely the phase offset and amplitude) of the variation in the measurements at at least one predetermined spatial frequency.

The above description provides numerous methods for determining the encoder apparatus' sub-divisional error by analysing only the measurements obtained by the apparatus within which the encoder apparatus is provided (i.e. and without the use of measurements obtained by external/secondary measurement/calibration equipment such as an interferometer). Accordingly, the methods rely on analysing only measurements obtained by and/or determined from the apparatus' encoders.

The above also provides a description of a novel way of extracting an encoder apparatus' SDE by looking at variations in measurements obtained at at least one predetermined spatial frequency. The above also provides a description of a novel way of representing an encoder apparatus' SDE, e.g. by way of a function, and for example by way of a function which accommodates for changes in the encoder's SDE along the measurement range. In these case, it will be understood that data required for determining the SDE can be obtained through the use of traditional techniques, such as via the use of external calibration equipment, as well as via the novel methods taught above. For example, the SDE can be determined in a known way by comparing the outputs of the encoder apparatus with the outputs of a calibrated interferometer, and then an error function for describing the SDE can be determined in line with the above described techniques.

In the described embodiment, the coordinate positioning machine is a serial CMM (i.e. in which the three linear degrees of freedom is provided by three independent, orthogonal axes of motion). However, as will be understood, the invention can also be used to control the movement of other types of coordinate positioning machines, such as parallel CMMs, robot arms or the like. The invention can also be used with not just dedicated CMMs, but also with other types of coordinate positioning machines such as machine tools. Furthermore, as will be understood, the invention is also suitable for use with Cartesian and non-Cartesian positioning machines, such as polar and spherical coordinate positioning machines.

The invention claimed is:

1. A method of determining sub-divisional error of an encoder apparatus that is configured to measure relative position of relatively moveable parts of an apparatus on which an inspection device is mounted, the method comprising:
causing the inspection device to inspect a feature so as to obtain measurements of a surface of the feature by relatively moving the relatively moveable parts of the apparatus; and
using the measurements of the surface of the feature obtained by the inspection device during the inspection of the feature to determine the sub-divisional error of the encoder apparatus.

2. The method as claimed in claim 1, further comprising determining at least one error map for correcting for the sub-divisional error of the encoder apparatus.

3. The method as claimed in claim 2, wherein the at least one error map comprises a look-up table or function.

4. The method as claimed in claim 2, wherein
the error map comprises a description of a form of the sub-divisional error, and
the description varies along a measurement range of the encoder apparatus.

5. The method as claimed in claim 1, further comprising determining the sub-divisional error of the encoder apparatus based on properties of a periodic variation in the measurements at at least one predetermined spatial frequency.

6. The method as claimed in claim 5, wherein the properties comprise amplitude and phase offset of the periodic variation at the at least one predetermined spatial frequency.

7. The method as claimed in claim 5, wherein the at least one predetermined spatial frequency corresponds to a scale or signal period of the encoder apparatus.

8. The method as claimed in claim 7, wherein the at least one predetermined spatial frequency corresponds to harmonics of the scale or signal period of the encoder apparatus.

9. The method as claimed in claim 1, further comprising determining the sub-divisional error for different regions of a measurement range of the encoder apparatus.

10. The method as claimed in claim 1, wherein
the apparatus on which the inspection device is mounted comprises at least one rotational axis about which the inspection device can be oriented, and
the encoder apparatus is a rotary encoder apparatus for measuring orientation of the inspection device about the at least one rotational axis.

11. The method as claimed in claim 1, wherein the inspection device comprises a contact probe.

12. The method as claimed in claim 11, wherein
the contact probe comprises a stylus having a stylus tip, and
the measurements relate to stylus tip position measurements.

13. The method as claimed in claim 1, wherein the apparatus on which the inspection device is mounted comprises a coordinate positioning machine.

14. The method as claimed in claim 1, wherein the encoder apparatus comprises a scale and a readhead for reading the scale.

15. A non-transitory computer-readable medium comprising computer program code comprising instructions that, when executed by a controller of an apparatus, cause the apparatus to perform the method of claim 1.

16. The method as claimed in claim 1, wherein
the encoder apparatus comprises a scale and at least one readhead that outputs a periodic signal that represents position and/or motion of the scale relative to the at least one readhead, the scale comprising a series of periodic features, and
the sub-divisional error of the encoder apparatus is determined to a resolution finer than a period of the periodic signal.

17. A computer implemented method comprising:
receiving measurements of a surface of a feature obtained by an inspection device mounted on an apparatus in which an encoder apparatus is incorporated, the measurements of the surface of the feature being derived from output of the encoder apparatus; and determining sub-divisional error of the encoder apparatus from the measurements of the surface of the feature.

18. A method of determining sub-divisional error of an encoder apparatus comprising a scale and readhead, the method comprising:

moving the scale and readhead relative to each other and using an inspection device, a position of which is determined from output of the readhead, to obtain measurements of a surface of a feature; and determining the sub-divisional error of the encoder apparatus based on a periodic variation in the measurements of the surface of the feature obtained by the inspection device at at least one predetermined spatial frequency.

19. The method as claimed in claim 17, wherein the at least one predetermined spatial frequency corresponds to a signal period or a scale period of the readhead.

20. The method as claimed in claim 19, wherein the at least one predetermined spatial frequency corresponds to harmonics of the signal period or the scale period of the readhead.

21. The method as claimed in claim 17, further comprising generating an error map for correcting for the determined sub-divisional error.

22. An apparatus comprising:

an encoder that is configured to measure relative position of relatively moveable parts of the apparatus; and an inspection device, wherein the apparatus is configured (i) to cause the inspection device to inspect a feature so as to obtain measurements of a surface of the feature by relatively moving the relatively moveable parts of the apparatus and (ii) to use the measurements of the surface of the feature obtained by the inspection device during the inspection of the feature to determine sub-divisional error of the encoder.

* * * * *